US011068439B2

(12) United States Patent
Bicer et al.

(10) Patent No.: US 11,068,439 B2
(45) Date of Patent: Jul. 20, 2021

(54) UNSUPERVISED METHOD FOR ENRICHING RDF DATA SOURCES FROM DENORMALIZED DATA

(71) Applicant: INTERNATIONAL BUSINESS MACHINES CORPORATION, Armonk, NY (US)

(72) Inventors: Veli Bicer, Dublin (IE); Nuno Lopes, Dublin (IE); Spyros Kotoulas, Dublin (IE); Martin Stephenson, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 455 days.

(21) Appl. No.: 15/180,865

(22) Filed: Jun. 13, 2016

(65) Prior Publication Data

US 2017/0357653 A1 Dec. 14, 2017

(51) Int. Cl.
*G06F 16/11* (2019.01)
*G06F 16/23* (2019.01)
(Continued)

(52) U.S. Cl.
CPC ........ *G06F 16/116* (2019.01); *G06F 16/2365* (2019.01); *G06F 16/84* (2019.01); *G06F 16/9024* (2019.01)

(58) Field of Classification Search
CPC ......... G06F 17/30557; G06F 17/30477; G06F 17/30917; G06F 17/30498;
(Continued)

(56) References Cited

U.S. PATENT DOCUMENTS 8,650,022 B2    2/2014 Boegl et al.
8,719,250 B2 *  5/2014 Chong ............... G06F 16/25
                                         707/713
(Continued)

OTHER PUBLICATIONS

Goasdoue, F. et al.; "Growing triples on trees: An XML-RDF hybrid model for annotated documents"; Ingenierie des systemes d'information, vol. 17, No. 5, pp. 87-111; 2012.
(Continued)

*Primary Examiner* — Alford W Kindred
*Assistant Examiner* — Cecile H Vo
(74) *Attorney, Agent, or Firm* — F. Chau & Associates, LLC

(57) ABSTRACT

A method for unsupervised transformation of denormalized data into RDF data includes summarizing an existing resource description framework (RDF) file wherein a data summary file is produced, wherein said RDF file includes a plurality of nodes, property labels, and literals and is represented as a directed graph, and said data summary file is a graph that includes a single instance of each node-property-literal triple in the RDF file; analyzing a plurality of denormalized records wherein a record summary is produced, wherein said record summary is represented as a directed graph with a root node corresponding to each record connected to a node for each field in the record; determining one or more transformation patterns that match elements of the record summary to elements of the data summary; and transforming the plurality of denormalized records into a new RDF file by executing one of the one or more transformation patterns.

20 Claims, 12 Drawing Sheets

(51) Int. Cl.
*G06F 16/84* (2019.01)
*G06F 16/901* (2019.01)

(58) Field of Classification Search
CPC ......... G06F 17/30595; G06F 17/30958; G06F 17/30389; G06F 17/30424; G06F 17/30442; G06F 17/30451; G06F 17/30457; G06F 17/30483; G06F 16/25; G06F 16/2455; G06F 16/24568; G06F 16/86; G06F 16/2456; G06F 16/284; G06F 16/9024; G06F 16/242; G06F 16/245; G06F 16/2453; G06F 16/24535; G06F 16/24553; G06F 16/2474; G06F 16/2477; G06F 16/248; G06F 16/24534; G06F 16/20; G06F 16/211; G06F 16/958; G06F 16/258; G06F 16/2365; G06F 16/116; G06F 16/84; G06F 16/22; G06F 16/2465; G06F 16/2452; G06F 16/24522; G06F 16/338; G06F 16/83; G06F 17/30
USPC .......... 707/E17.005, E17.045, E17.014, 690, 707/713, 802, 714, 999.001, E17.017, 707/602, 703, 705, 723, 736, 743, 753, 707/765, 792, 794, 797, 801, 999.1, 796, 707/809, 798, E17.006, 756, 999.004
See application file for complete search history.

(56) References Cited

U.S. PATENT DOCUMENTS

| | | | |
|---|---|---|---|
| 2006/0235823 A1* | 10/2006 | Chong | G06F 16/2455 |
| 2009/0138498 A1* | 5/2009 | Krishnamoorthy | G06F 16/2452 |
| 2013/0275448 A1 | 10/2013 | Mirhaji | |
| 2014/0278362 A1 | 9/2014 | Gerkin, III et al. | |
| 2016/0092554 A1* | 3/2016 | Srinivasan | G06F 16/248 707/798 |

OTHER PUBLICATIONS

Corlosquet, S. et al.; "Produce and consume Linked Data with Drupal!." Semantic Web—ISWC 2009. Proceedings 8th International Semantic Web Conference, pp. 763-778; 2009.

Dalamagas, T. et al.; "Modeling and manipulating the structure of hierarchical schemas for the Web"; Information Sciences, vol. 178, No. 4, pp. 985-1010; Feb. 15, 2008.

Anonymously; "System and Framework for Facilitating Faceted Interaction with Data froml Different Data Sources"; http://ip.com/IPCOM/000199917; Sep. 21, 2010.

Anonymously; "An XML to RDF to XML Mapping System with Applications to Document Generation and Reporting"; http://ip.com/IPCOM/000240399; Jan. 29, 2015.

* cited by examiner

Denormalized Records    41

| ID | F1 | F2 | F3 | F4 |
|----|------|---------|--------|----|
| 1  | Nuno | Lopes   | Canal  | IE |
| 2  | Spyros | Kotoulas | Capel | IE |
| 3  | Veli | Bicer   | Strand | IE |

Summary    43

Transformation Patterns    46

| ?x  | Address | ?y      |
|-----|---------|---------|
| ?x  | Type    | String  |
| ?y  | Street  | ?z      |
| ?z  | Type    | String  |
| ?y  | Zip     | ?a      |
| ?a  | Type    | Integer |
| ... | ...     | ...     |

Ranked Transformation Patterns    53

| | | | |
|---|---|---|---|
| ✓ $ID | Address | ?y | 2 |
| ✓ $ID | Type | String | 3 |
| ✓ ?y | Street | $F3 | 1 |
| ✓ $ID | First Name | $F1 | 4 |
| ?z | Type | String | |
| ?y | Zip | ?a | |
| ?a | Type | Integer | |
| ... | ... | ... | |

UNSUPERVISED METHOD FOR ENRICHING RDF DATA SOURCES FROM DENORMALIZED DATA

BACKGROUND

Technical Field

Embodiments of the present disclosure are directed to methods of transforming denormalized data into RDF data.

Discussion of the Related Art

Many sources provide data in a table-like, semi-structured, format, such as comma separated values, Excel, Lists and HTML tables, and Web Services outputs. These formats are denormalized and schemaless. Denormalized means the data has not been reduced to relational database fields and tables which minimize redundancies and dependencies, and schemaless means the data lacks a formal structure. Vast amounts of information are available on the Web in such formats The Resource Description Framework (RDF) is a normalized format that represents data as a set of entities that may conform to a pre-defined vocabulary, i.e., a schema, and it is based upon the idea of making statements about resources in the form of subject-predicate-object expressions, known as triples. The subject denotes the resource, and the predicate denotes traits or aspects of the resource and expresses a relationship between the subject and the object. A collection of RDF statements can represent a labeled, directed multi-graph and is thus better suited to certain kinds of knowledge representation than the relational model. Many datasets are being published on the Web in RDF format, such as city and government data. However, enriching RDF datasets with data in other formats requires a transformation step.

Transforming semi-structured data into a semantically enriched format, a process known as lifting, is challenging. There is no 1-1 mapping between rows of source data and semantic entities, as usually each row spans a number of corresponding entities in an RDF table. Current approaches rely on a-priori (predefined) transformations which can become obsolete in the context of dynamically changing linked data sources. Lifting the data into a semantic representation is a key challenge to be addressed.

SUMMARY

According to an embodiment of the disclosure, there is provided a computer implemented method for unsupervised transformation of denormalized data into RDF data, including summarizing an existing resource description framework (RDF) file wherein a data summary file is produced, wherein said RDF file includes a plurality of nodes, property labels, and literals and is represented as a directed graph, and said data summary file is a graph that includes a single instance of each node-property-literal triple in the RDF file, analyzing a plurality of denormalized records wherein a record summary is produced, wherein said record summary is represented as a directed graph with a root node corresponding to each record connected to a node for each field in the record, determining one or more transformation patterns that match elements of the record summary to elements of the data summary, and transforming the plurality of denormalized records into a new RDF file by executing one of the one or more transformation patterns.

According to a further embodiment of the disclosure, the method includes appending the new RDF file to the existing RDF file.

According to a further embodiment of the disclosure, the method includes ranking the one or more transformation patterns based on which transformation pattern best matches elements of the record summary to elements of the data summary.

According to a further embodiment of the disclosure, one of the one or more transformation patterns is a best transformation pattern, based on the rankings of the one or more transformation patterns.

According to a further embodiment of the disclosure, the method includes monitoring changes to the existing RDF file, and updating the data summary file when a change occurs in the existing RDF file.

According to a further embodiment of the disclosure, the method includes validating the one of the one or more transformation patterns by checking whether some selected transformation patterns are consistent with a domain knowledge of a user.

According to another embodiment of the disclosure, there is provided a non-transitory program storage device readable by a computer, tangibly embodying a program of instructions executed by the computer to perform the method steps for unsupervised transformation of denormalized data into RDF data.

BRIEF DESCRIPTION OF THE DRAWINGS

FIG. 11 depicts an exemplary a set of new RDF Triples obtained from the set of denormalized records, according to an embodiment of the disclosure.

DETAILED DESCRIPTION OF EXEMPLARY EMBODIMENTS

Figure 1:
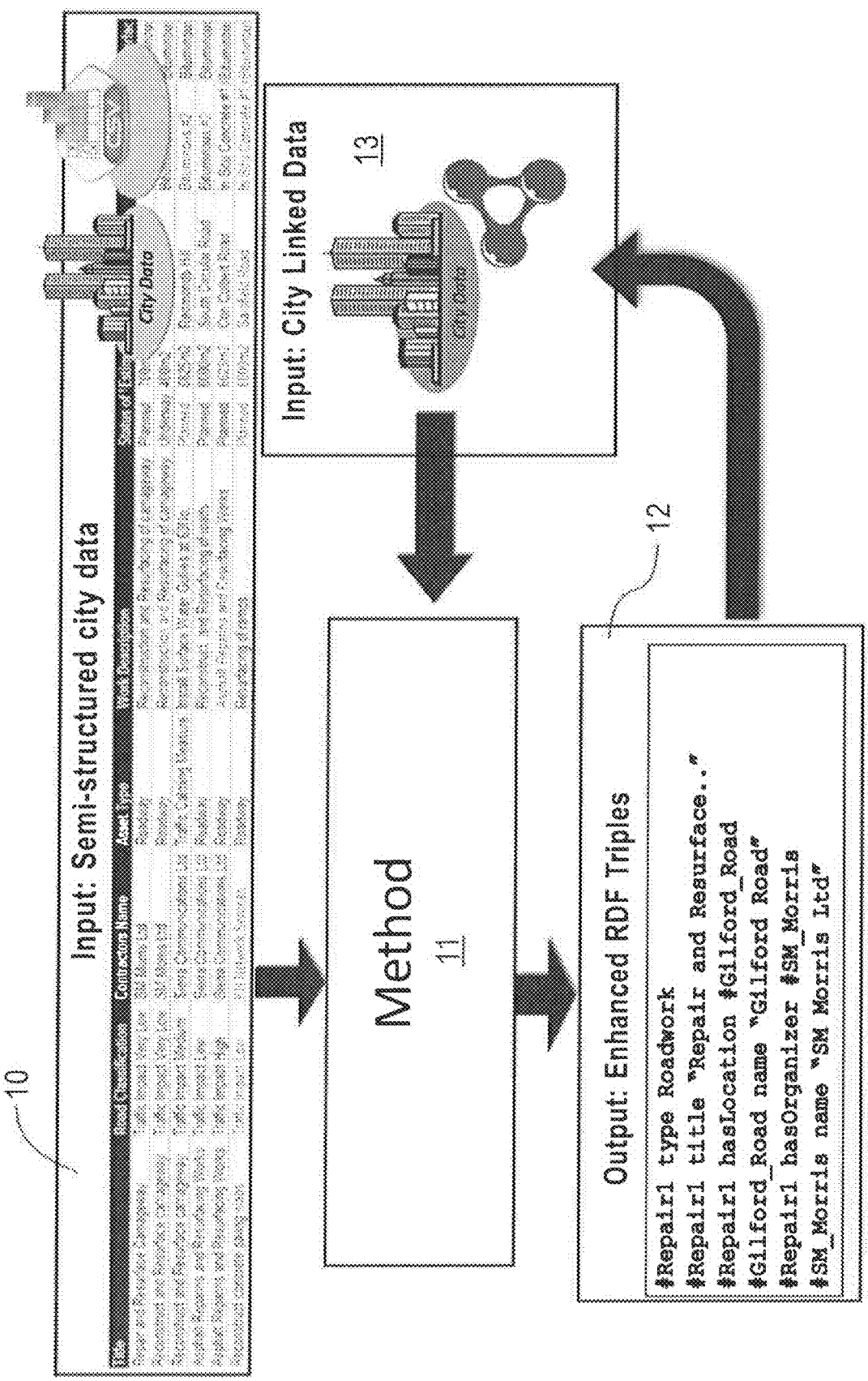
FIG. 1 is a schematic block diagram of an overview of an unsupervised method to discover transformation patterns which are adaptive to RDF data sources and denormalized data, according to embodiments of the disclosure.

Exemplary embodiments of the disclosure as described herein generally include unsupervised method for discovering transformation patterns which are adaptive to RDF data sources and denormalized data. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Current approaches for lifting data into a semantic representation include relation extraction, schema matching and mapping, ETL (Extract, Transform, and Load), and linked data integration.

Relation extraction is a process that extracts structure from text using natural language processing methods. The text content of the documents needs to be adequately captured as a set of binary relations that form a directed graph. However, the supported inputs are limited to the text and not able to handle semi-structured data. In addition, relation extraction cannot extract structure if there is insufficient textual information, and cannot establish complex relationships among different entities.

Schema matching is the process of identifying two objects that are semantically related while mapping refers to the transformations between the objects. However, schema matching requires the data to conform to a well-defined schema and results in alignments between schema. This is not applicable in a current context of highly dynamic data and schemas. In addition, automating schema matching, in the context of schema changes, is challenging because of the differing and often not explicated or documented semantics of the two schemas. In addition, schema matching assumes a fixed database schema for both the source and target, and changes are not well-addressed. For RDF datasets, decentralized and dynamic schemas, sometimes implicitly defined within the data, also makes it challenging to apply schema matching.

Extract, transform and load (ETL) refers to a process in database usage and especially in data warehousing that involves (1) extracting data from outside sources; (2) transforming the data to fit operational needs, which can include quality levels; and (3) loading the data into the end target, such as a database, or more specifically, an operational data store, data mart or data warehouse.

Linked data integration refers to methods for adopting previous data integration techniques, such as schema matching, in the context of RDF. Due to the top-down approach taken in most of these methods, it is not well-suited to the dynamic, schema-less RDF setting in which: (1) external link specifications (counterpart to schema matching are considered as an input; and (2) the dynamic changes in the overall RDF structure and vocabulary, especially schema, makes the link specifications obsolete. Linked data integration mainly focuses on establishing the links between different datasets using owl:sameAs relations, however, linked data integration requires intensive manual effort and expert knowledge, excepts for automatic link prediction, which only considers establishing some links between existing objects, and does not address the entire population of a directory service.

FIG. 1 is a schematic block diagram of an overview of an unsupervised method to discover transformation patterns which are adaptive to RDF data sources and denormalized data, according to embodiments of the disclosure. An exemplary, non-limiting input is a table 10 of semi-structured city data of a plurality of road maintenance projects, in which each table record includes, inter alia, a project title, a road classification, a contractor name, the project asset type, the work description, the project status, and the name of the road itself. Note that the input data is represented as a table 10, the input table may also be in the form of comma-separated values (CSVs). Table 10 is provided as input to method 11, which yields table 12, which is a list of enhanced RDF triples. A method according to embodiments of the disclosure does not require a mapping definition. In addition, the output table 12 can be combined with other city linked data 13, and be provided as input in another iteration of transforming denormalized data into enhanced RDF data. In other embodiments, a method for transforming denormalized data into RDF triples can be trained to perform the transformation for data in a target domain from existing data in the target domain.

Figure 2:
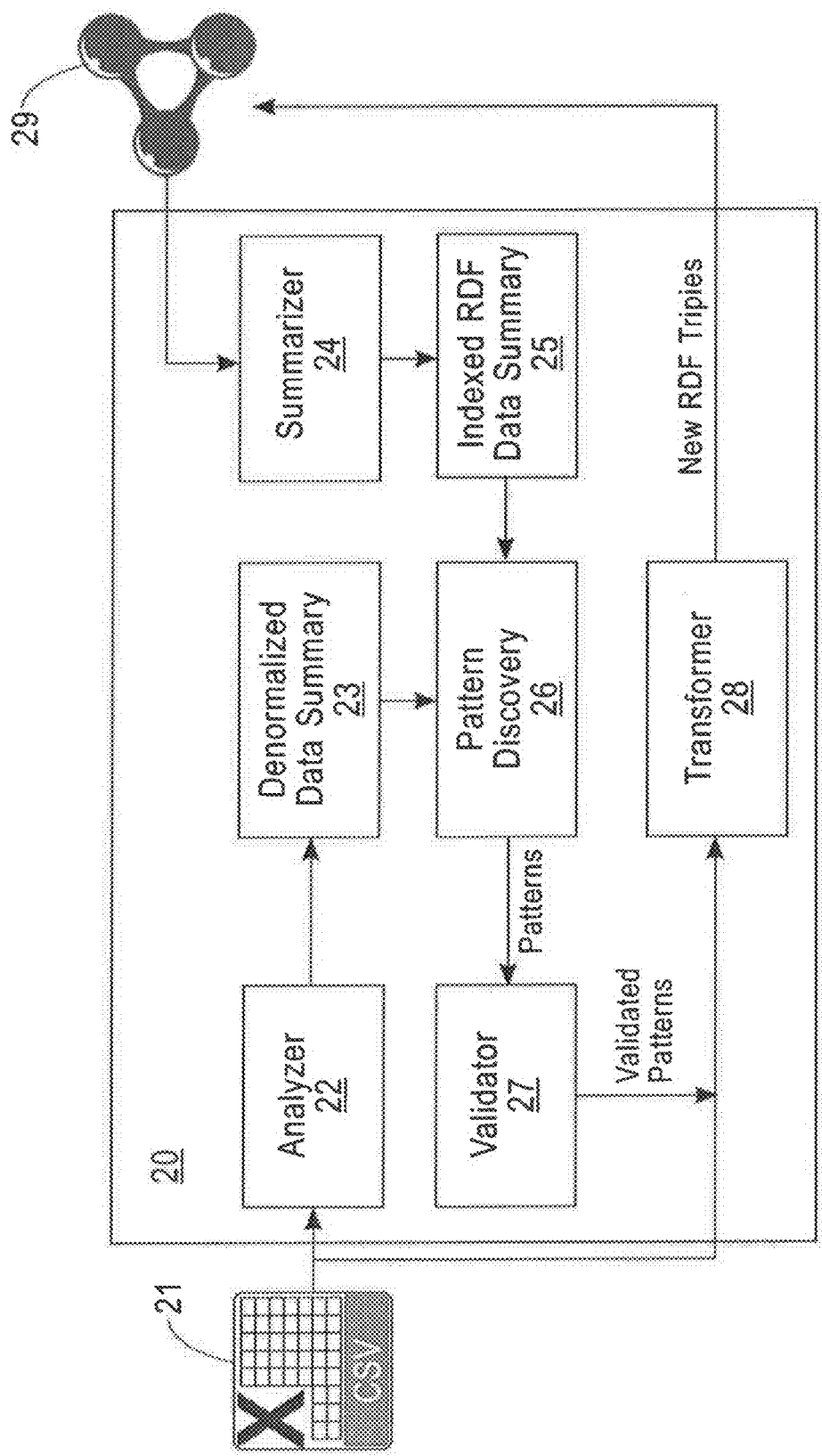
FIG. 2 is a schematic block diagram of the components of an unsupervised method to discover transformation patterns which are adaptive to RDF data sources and denormalized data, according to embodiments of the disclosure.

FIG. 2 is a schematic block diagram of the components of an unsupervised method to discover transformation patterns which are adaptive to RDF data sources and denormalized data, according to embodiments of the disclosure. A method 20 according to an embodiment of the disclosure may begin by summarizing 24 RDF source data 29 to produce an indexed RDF data summary 25. A method also analyzes 22 denormalized data 21 to produce a denormalized data summary 23, and the denormalized data summary 23 is used with the indexed RDF data summary 25 to discover 26 patterns in the data. The patterns can be combined with the denormalized data 21 to be transformed into an enhanced set of RDF triples. These steps will be described in detail with reference to FIGS. 3, 4, and 5, below.

Figure 3:
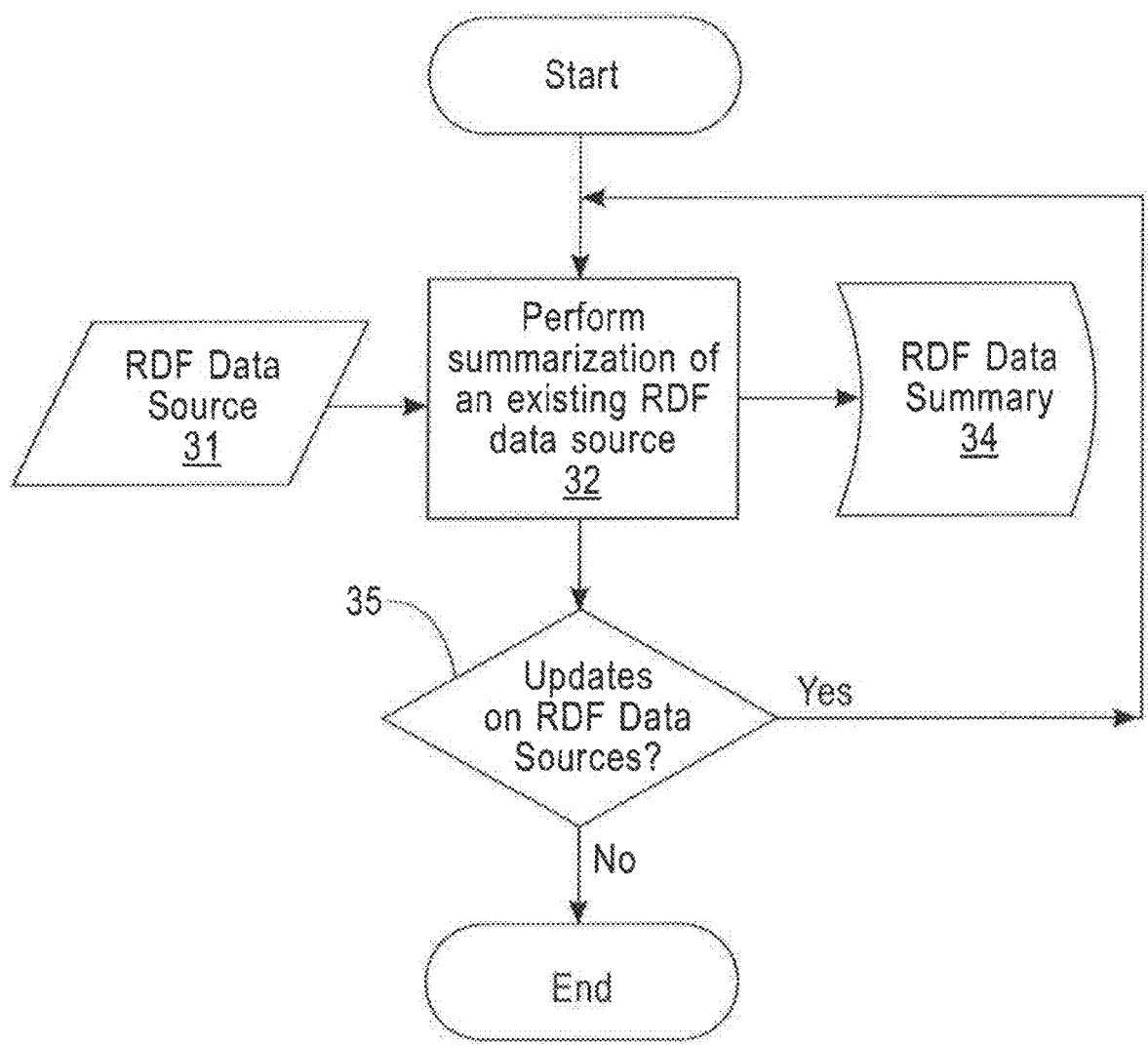
FIG. 3 is a flow diagram of a preprocessing method, according to embodiments of the disclosure.

FIG. 3 is a flow diagram of a preprocessing method, according to embodiments of the disclosure. A preprocessing method according to an embodiment starts by summarizing at step 32 an existing RDF data source 31, represented as a (non-disjoint) set of nodes N, property labels P and literals L, to produce an indexed data summary 34 of data source 31 using existing data summarization techniques. In some embodiments, the data summary 34 can be indexed. A preprocessing method also monitors changes to RDF data source 31 at step 35, and loops back to step 32 to update the data summary 34 to reflect any changes.

Figure 6:
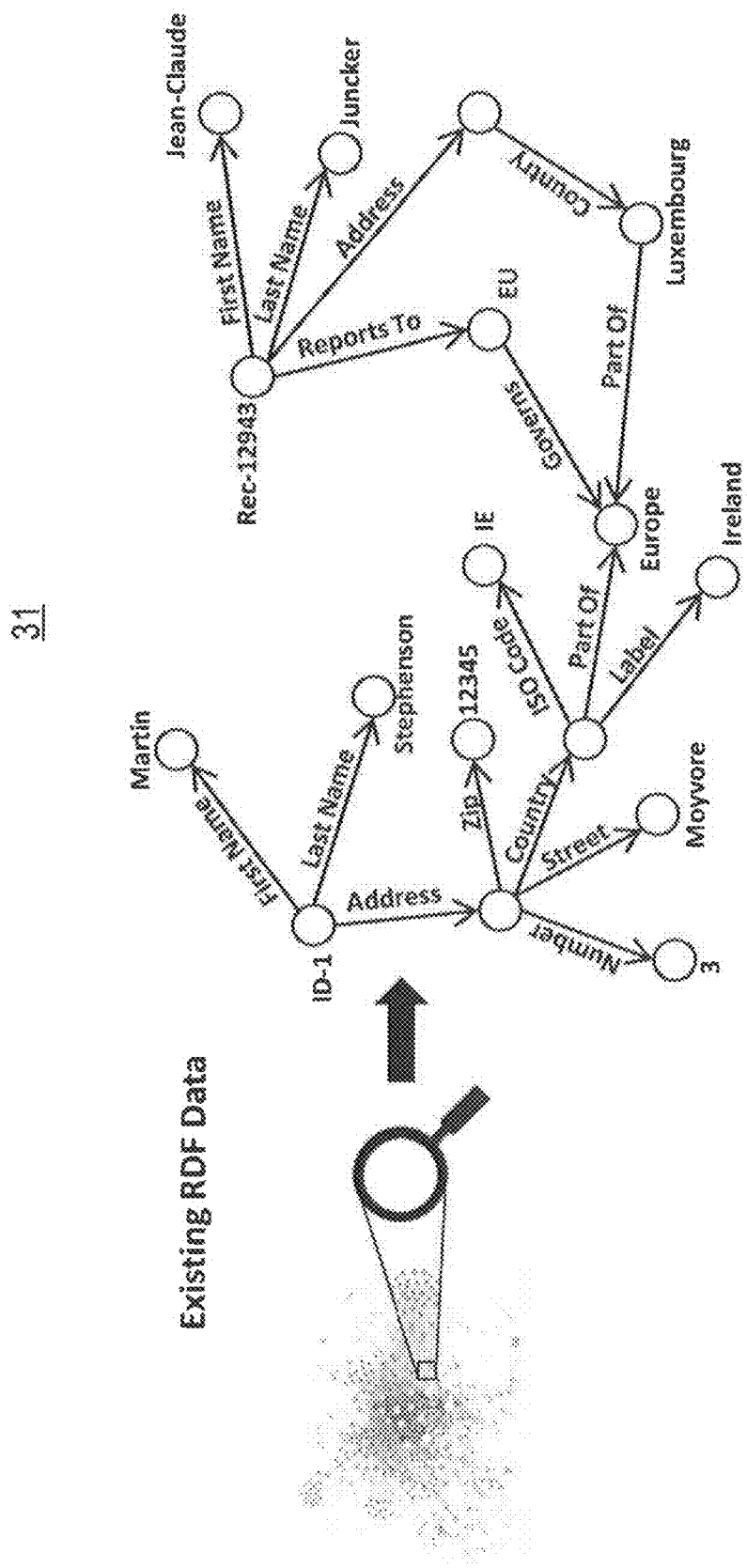
FIG. 6 depicts an exemplary existing RDF data source, according to an embodiment of the disclosure.
Figures 7, 8:
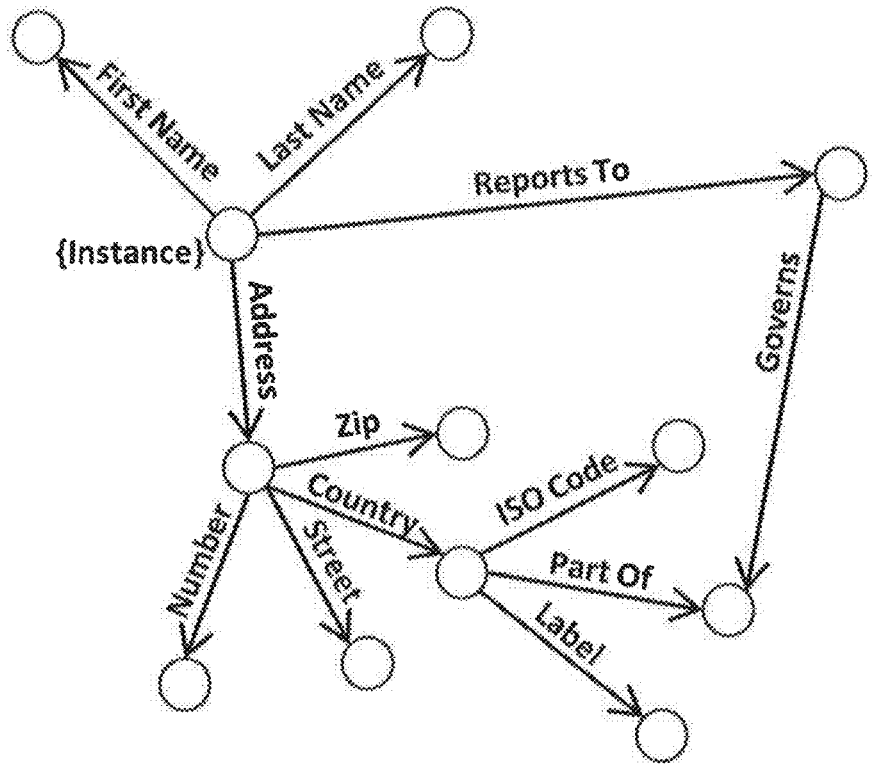
FIG. 7 depicts an exemplary data summary, according to an embodiment of the disclosure.
FIG. 8 depicts an exemplary set of denormalized records, according to an embodiment of the disclosure.

FIG. 6 depicts an exemplary existing RDF data source 31, and FIG. 7 depicts an exemplary data summary 34. Referring to FIG. 6, the graph portion shown on the right is an enlargement of a much vaster graph shown on the left. The graph portion includes a plurality of nodes that represent RDF subjects connected to other nodes that represent RDF objects by directed edges that represent RDF predicates. The direction of the arrow indicates that the value of the destination node pointed to by the arrow is associated with the value of the source node, with the relationship being denoted by the edge label. The leaf nodes are labeled with values, and the edges are labeled with the relationship connected to source node to the destination node. For example, node ID-1 is the root node of a graph that represents a person whose first name is Martin, last name is Stephenson, whose address is a node connected to a plurality of other nodes, each associated with a portion of the address, such as street number, street, country, zip code, and the country node is further connected to plurality of other nodes, respectively associated with the country name, the political union that the country is part of, and the ISO code. Similarly, node Rec-12943 is the root node of a graph that represents current European Union President Jean-Claude Juncker. Note that the graphs for nodes ID-1 and Rec-12943 are connected at the leaf node labeled "Europe".

FIG. 7 depicts an exemplary data summary 34 that summarizes the node type and relationships of FIG. 6, for an instance of a root node. Each relationship in FIG. 6, represented by a directed edge, appears once in FIG. 7, and the nodes appear as necessary as sources/destinations of the edges.

An exemplary, non-limiting data summarization technique is that disclosed in Tran, et al., "Structure index for RDF data", Workshop on Semantic Data Management (SemData@ VLDB), 2010, the contents of which are herein incorporated by reference in their entirety.

Figure 4:
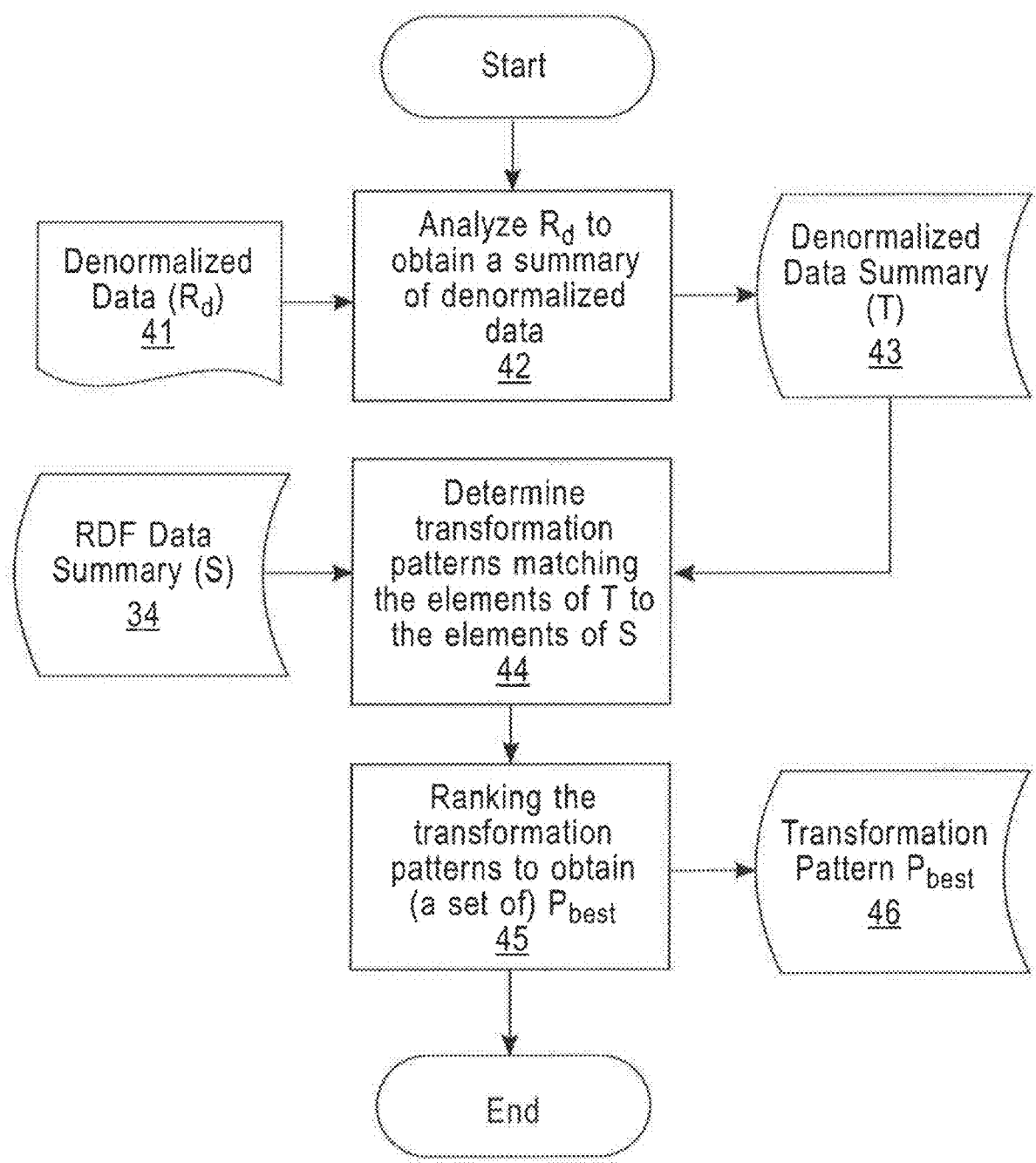
FIG. 4 is a flow diagram of a method for pattern discovery, according to an embodiment of the disclosure.

FIG. 4 is a flow diagram of a method for pattern discovery, according to an embodiment of the disclosure. A pattern discovery method begins at step 42 by analyzing a set of denormalized records 41 to obtain a denormalized data summary 43. The set of denormalized records 41 can be analyzed by methods such as those disclosed in Tran, et al., "Structure index for RDF data", Workshop on Semantic Data Management (SemData@ VLDB), 2010, incorporated by reference above. Next, transformation patterns that match the elements of the denormalized data summary 43 to the elements of the indexed data summary 34 can be determined at step 44 by exploring data summary 34 based on information in denormalized data summary 43 using existing graph exploration techniques. The transformation patterns are ranked at step 45 to discover the best possible pattern 46 for transformation. Criteria for ranking the transformation patterns include the size of the set of patterns, in which case the smallest set of patters that provides the best coverage of the denormalized records 41 would be selected as the best possible pattern 46.

Other criteria for selecting a best pattern include (1) the coverage of the denormalised data, i.e. max(number of columns from the denormalised data to be included in the transformation), (2) the coverage of the denormalised data and the number of patterns, i.e. max(number of columns from the denormalised data to be included in the transformation—a×number of patterns), where a is a predetermined weighting factor, (3) the coverage of the denormalised data, the number of patterns and the diameter of the resulting graph, i.e. max(number of columns from the denormalised data to be included in the transformation—a×number of patterns—b×graph diameter), where b is a predetermined weighting factor.

An exemplary, non-limiting graph exploration technique is that disclosed in Tran, et al., "Top-k exploration of query candidates for efficient keyword search on graph-shaped (rdf) data", IEEE 25$^{th}$ International Conf. on Data Engineering, 2009, the contents of which are herein incorporated by reference in their entirety.

Figures 9, 10:
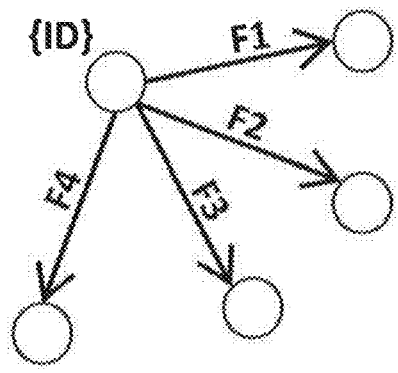
FIG. 9 depicts an exemplary denormalized data summary, according to an embodiment of the disclosure.
FIG. 10 depicts an exemplary best transformation pattern, according to an embodiment of the disclosure.

FIG. 8 depicts an exemplary set of denormalized records 41, FIG. 9 depicts an exemplary denormalized data summary 43, and FIG. 10 depicts an exemplary best transformation pattern 46.

The set of denormalized records 41 shown FIG. 8 is represented by a table of records, with columns ID, F1, F2, F3, and F3. The ID column contains identifier for the data in its associated row. The F1, F2, and F3 columns respective include a family name, a personal name, a street name that is part of an address, and an ISO country code. Note that for clarity, not all components of an address are shown in the table of FIG. 8. The graph shown in FIG. 9 illustrates the relationship between the ID field of each row, and the data in the F1, F2, F3, and F4 fields.

The table in FIG. 10 represents the patterns in the data summary graph of FIG. 7. In FIG. 10, the left column includes RDF subjects, the middle column includes RDF predicates, and the right column includes RDF objects. For example, the subject ?x in the first row has an address ?y that includes a street ?z whose data type is string. The subject ?x in the first row also has a data type of string, and the address ?y includes a Zip ?a of data type integer.

Figure 5:
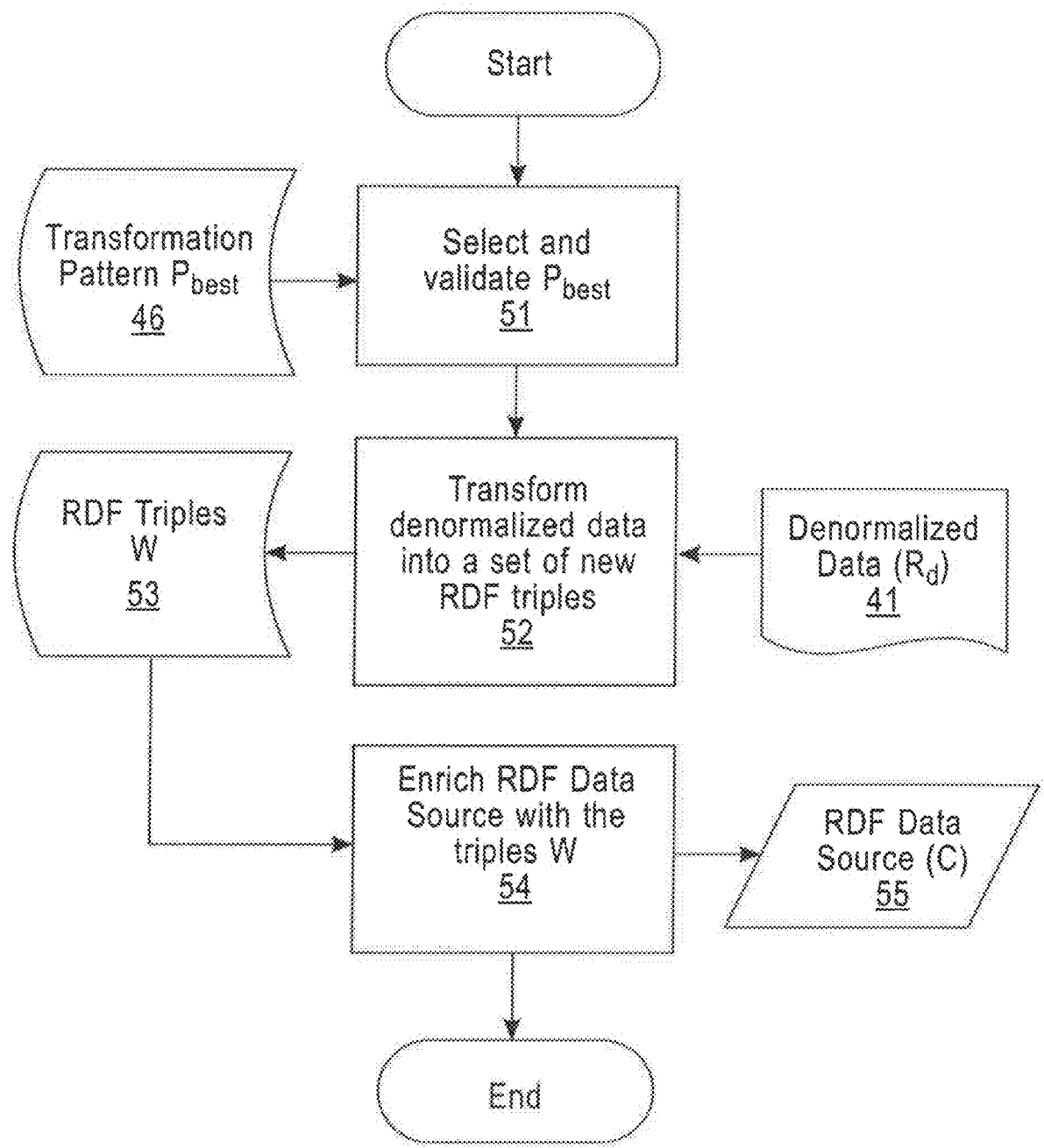
FIG. 5 is a flow diagram of a method for transformation, according to an embodiment of the disclosure.

FIG. 5 is a flow diagram of a method for transformation, according to an embodiment of the disclosure. A transformation method may begin at step 51 by selecting and validating a transformation pattern of the best possible patterns 46. A transformation pattern can be validated manually by checking whether some example results are consistent with the domain knowledge of a user. In some embodiments, step 51 can be omitted. Next, at step 52, the set of denormalized records 41 can be transformed into a set of new RDF triples 53 by executing the best pattern 46, and the new RDF triples can be transformed into a RDF graph, shown in FIG. 12. The RDF data source 31 can be enriched at step 54 by the new RDF graph to produce an enriched RDF data source 55. According to embodiment, the RDF data source 31 can be enriched by appending the new RDF Triples 53 to the RDF data source 31, or by adding the graphs of FIG. 12 to the graph of FIG. 6, since all graphs are connected at the country node.

Figure 12:
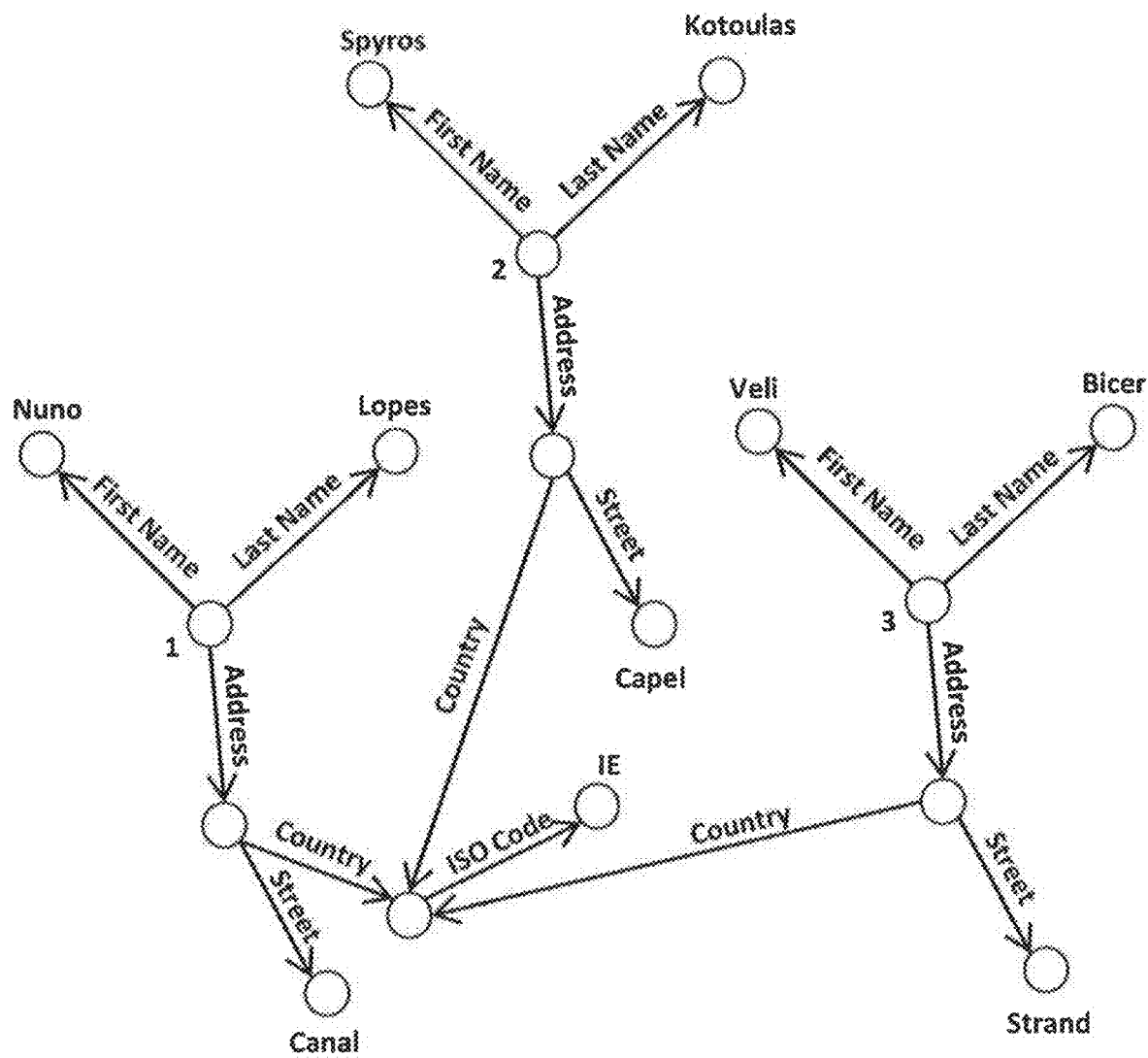
FIG. 12 depicts an exemplary enriched RDF data source, according to an embodiment of the disclosure.

FIG. 11 depicts an exemplary a set of new RDF Triples 53 obtained from the set of denormalized records 41, shown in FIG. 8, by executing the best pattern 46, shown in FIG. 10, and FIG. 12 depicts an exemplary enriched RDF data source 55. In the table of FIG. 11, the subject identifiers ?x have been replace with references to the first column label in FIG. 8, and object identifiers ?z have been replaced with references to column labels F1 and F3 in FIG. 8, and the rows have been ranked, with the rankings appearing on the right side of the table.

By following the links in the set of new RDF Triples 53 of FIG. 11, the graph of FIG. 12 can be constructed. For example, field value $ID in the first row of FIG. 11 corresponds to a root node whose value would be obtained from the ID fields in FIG. 8, with a directed edge labeled "Address" pointing to node ?y. The second row of FIG. 11 indicates that the root node has a string type value, and the third row indicates that there is a directed edge from the node ?y labeled street to another node, whose value is obtained from the F3 field of the first row in FIG. 8. In addition, field value $ID in the first row of FIG. has another directed edge labeled "first name" pointing to a node whose value is obtained from the F1 field of the first row of FIG. 8.

In FIG. 12, the numbers "1", "2", and "3" appearing next to the root nodes respectively refer to ID of the rows of the table of denormalized records 41 in FIG. 8.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 13:
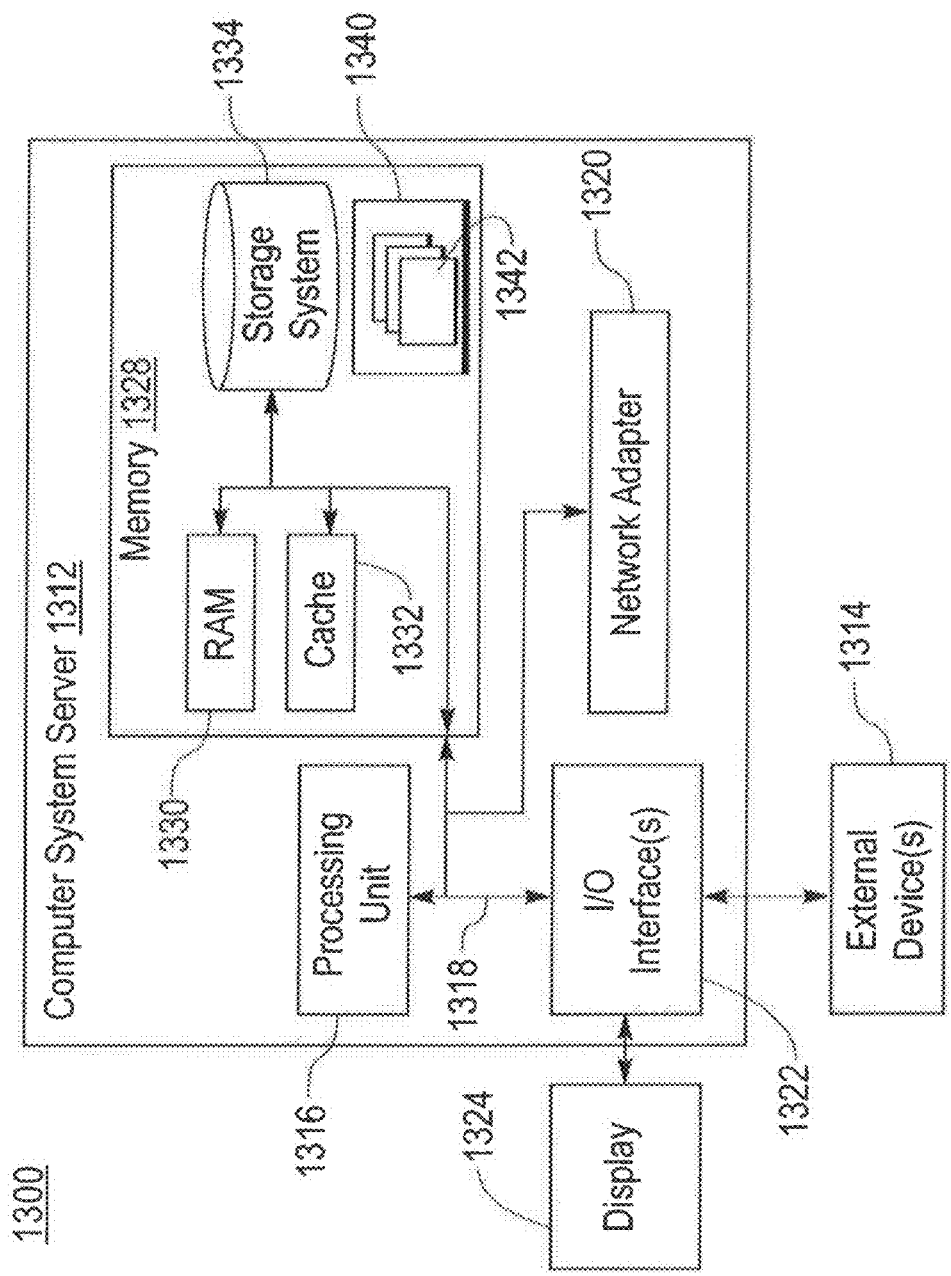
FIG. 13 is a schematic of an exemplary cloud computing node that implements an embodiment of the disclosure.

Referring now to FIG. 13, a schematic of an example of a cloud computing node is shown. Cloud computing node 1300 is only one example of a suitable cloud computing node and is not intended to suggest any limitation as to the scope of use or functionality of embodiments of the disclosure described herein. Regardless, cloud computing node 1300 is capable of being implemented and/or performing any of the functionality set forth hereinabove.

In cloud computing node 1300 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1312 in cloud computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, memory 1328 may include at least one program product having a set (e.g., at least one) of program modules that are configured to carry out the functions of embodiments of the disclosure.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the disclosure as described herein.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

Figure 14:
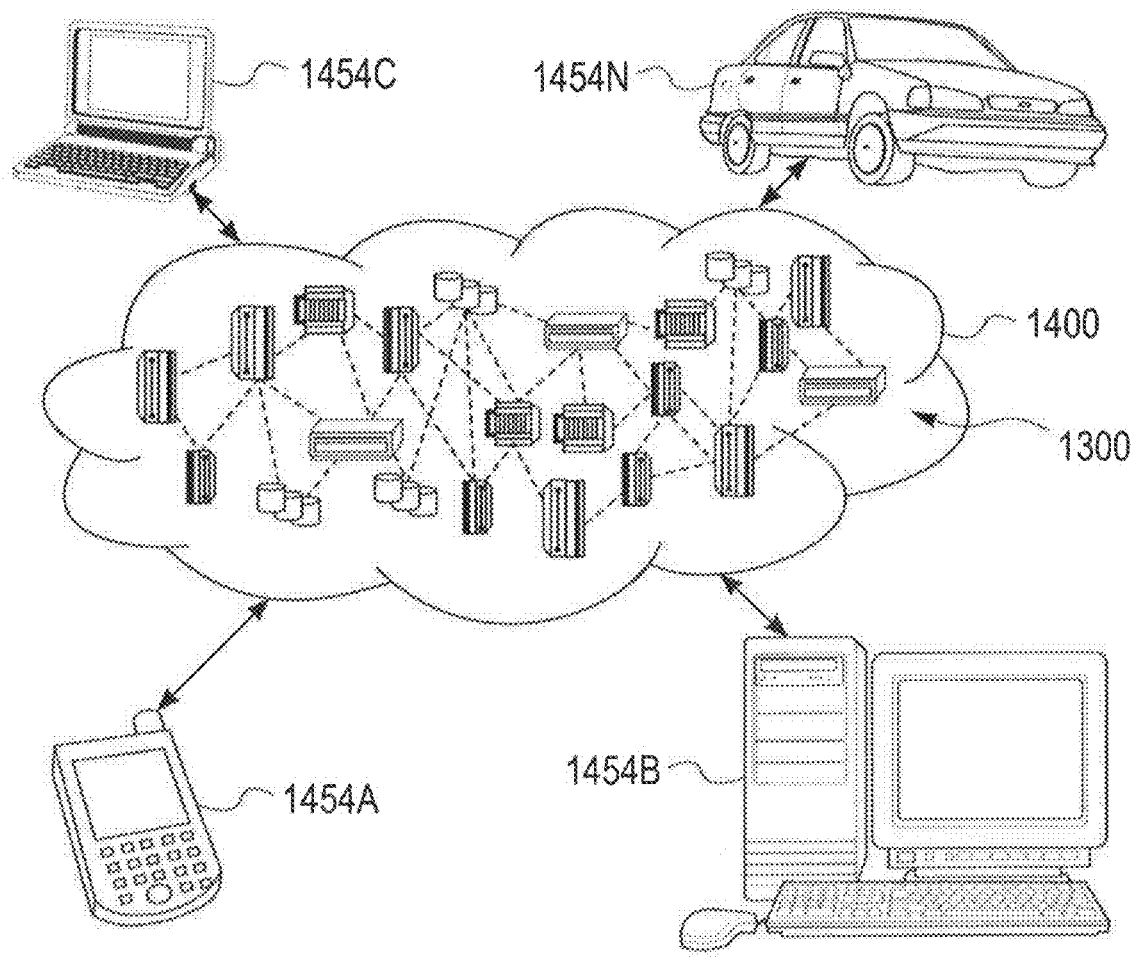
FIG. 14 shows an exemplary cloud computing environment according to embodiments of the disclosure.

Referring now to FIG. 14, illustrative cloud computing environment 1400 is depicted. As shown, cloud computing environment 1400 comprises one or more cloud computing nodes 1300 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1300 may communicate with one another. They may be grouped (not shown) physically or virtually, in one or more networks, such as Private, Community, Public, or Hybrid clouds as described hereinabove, or a combination thereof. This allows cloud computing environment 1400 to offer infrastructure, platforms and/or software as services for which a cloud consumer does not need to maintain resources on a local computing device. It is understood that the types of computing devices 1454A-N shown in FIG. 13 are intended to be illustrative only and that computing nodes 1300 and cloud computing environment 1400 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer implemented method for unsupervised transformation of denormalized data into RDF data, the method performed by the computer comprising the steps of:

summarizing an existing resource description framework (RDF) file wherein a data summary file is produced, wherein said RDF file includes a plurality of nodes that represent RDF triples, wherein RDF subjects connected to other nodes that represent RDF objects by labeled directed edges that represent RDF predicates, and said data summary file is a graph that includes, for each root node, each predicate appears once and is represented by a directed edge, and other nodes appear as necessary as sources or destinations of the edges;

analyzing a plurality of denormalized records wherein a denormalized record summary is produced, wherein denormalized records are records that have not been reduced to relational database fields and tables, wherein each denormalized record includes an identifier and a plurality of data fields associated with the identifier, wherein said denormalized record summary is represented as a plurality of directed graphs wherein a root node of each graph corresponds to the identifier of each record, and each record is connected by a directed edge to a node for each data field in the record;

determining one or more transformation patterns that match elements of the denormalized record summary to elements of the data summary; and transforming the plurality of denormalized records into a new plurality of RDF triples by executing one of the one or more transformation patterns, wherein a subject identifier in each RDF triple of the new plurality of RDF triples is a reference to an identifier of a record of the plurality of denormalized records, and an object identifier in each RDF triple of the new plurality of RDF triples is a reference to a data field of the record of the plurality of denormalized records associated with the subject identifier of said RDF triple; and transforming the new plurality of RDF triples into an RDF graph.

2. The method of claim 1, further comprising creating an enriched RDF file by appending the new RDF file to the existing RDF file.

3. The method of claim 1, further comprising ranking the one or more transformation patterns based on which transformation pattern best matches elements of the denormalized record summary to elements of the data summary.

4. The method of claim 3, further comprising selecting one of said one of the one or more transformation patterns as a best transformation pattern, based on the rankings of the one or more transformation patterns, where said best transformation pattern comprises a plurality of records, wherein each record includes an RDF subject, an RDF predicate and an RDF object.

5. The method of claim 4, wherein criteria for ranking the one or more transformation patterns include a size of a set of transformation patterns, wherein criteria for selecting best transformation pattern include which transformation pattern is a smallest set of transformation patterns that provides a best coverage of the denormalized records would be selected as the best possible pattern, which transformation pattern provides a maximum number of columns from the denormalised data in the transformation pattern, which transformation pattern has a maximum number of columns from the denormalised data in the transformation pattern times a number of patterns, and which transformation pattern has a maximum number of columns from the denormalised data in the transformation times a number of patterns times a diameter of a graph of the transformation pattern.

6. The method of claim 3, wherein each RDF triple of the new plurality of RDF triples includes a ranking.

7. The method of claim 1, further comprising monitoring changes to the existing RDF file, and updating the data summary file when a change occurs in the existing RDF file.

8. The method of claim 1, further comprising validating the one of the one or more transformation patterns by checking whether some selected transformation patterns are consistent with a domain knowledge of a user.

9. The method of claim 1, wherein the direction of an arrow indicates that the value of a destination node pointed to by the arrow is associated with a label of the arrow and a value of the source node, with a relationship being denoted by the edge label, wherein leaf nodes are labeled with values, and edges are labeled with the relationship that connects a source node to the destination node.

10. The method of claim 1, wherein transforming the new plurality of RDF triples into an RDF graph comprises following links in the new plurality of RDF triples to obtain node values and edge labels from the plurality of denormalized records wherein each root nodes is labeled with the identifier of one of the denormalized records of the plurality of denormalized records, values of leaf nodes associated with each root node correspond to data fields associated with the identifier associated with the root node, and each edge is labeled with a predicate value of the RDF triple whose subject corresponds to a source node of said edge.

11. A non-transitory program storage device readable by a computer, tangibly embodying a program of instructions executed by the computer to perform the method steps for unsupervised transformation of denormalized data into RDF data, the method comprising the steps of:

summarizing an existing resource description framework (RDF) file wherein a data summary file is produced, wherein said RDF file includes a plurality of nodes that represent RDF triples, wherein RDF subjects connected to other nodes that represent RDF objects by labeled directed edges that represent RDF predicates, and said data summary file is a graph that includes, for each root node, each predicate appears once and is represented by a directed edge, and other nodes appear as necessary as sources or destinations of the edges;

analyzing a plurality of denormalized records wherein a denormalized record summary is produced, wherein denormalized records are records that have not been reduced to relational database fields and tables, wherein each denormalized record includes an identifier and a plurality of data fields associated with the identifier, wherein said denormalized record summary is represented as a plurality of directed graphs wherein a root node of each graph corresponds to the identifier of each record, and each record is connected by a directed edge to a node for each data field in the record;

determining one or more transformation patterns that match elements of the denormalized record summary to elements of the data summary; and transforming the plurality of denormalized records into a new plurality of RDF triples by executing one of the one or more transformation patterns, wherein a subject identifier in each RDF triple of the new plurality of RDF triples is a reference to an identifier of a record of the plurality of denormalized records, and an object identifier in each RDF triple of the new plurality of RDF triples is a reference to a data field of the record of the plurality of denormalized records associated with the subject identifier of said RDF triple; and transforming the new plurality of RDF triples into an RDF graph.

12. The non-transitory program storage device of claim 11, the method further comprising creating an enriched RDF file by appending the new RDF file to the existing RDF file.

13. The non-transitory program storage device of claim 11, the method further comprising ranking the one or more transformation patterns based on which transformation pattern best matches elements of the denormalized record summary to elements of the data summary.

14. The non-transitory program storage device of claim 13, further comprising selecting one of said one of the one or more transformation patterns is as a best transformation pattern, based on the rankings of the one or more transformation patterns, where said best transformation pattern comprises a plurality of records, wherein each record includes an RDF subject, an RDF predicate and an RDF object.

15. The non-transitory program storage device of claim 14, wherein criteria for ranking the one or more transformation patterns include a size of a set of transformation patterns,
- wherein criteria for selecting best transformation pattern include
- which transformation pattern is a smallest set of transformation patterns that provides a best coverage of the denormalized records would be selected as the best possible pattern,
- which transformation pattern provides a maximum number of columns from the denormalised data in the transformation pattern,
- which transformation pattern has a maximum number of columns from the denormalised data in the transformation pattern times a number of patterns, and
- which transformation pattern has a maximum number of columns from the denormalised data in the transformation times a number of patterns times a diameter of a graph of the transformation pattern.

16. The non-transitory program storage device of claim 13, wherein each RDF triple of the new plurality of RDF triples includes a ranking.

17. The non-transitory program storage device of claim 11, the method further comprising monitoring changes to the existing RDF file, and updating the data summary file when a change occurs in the existing RDF file.

18. The non-transitory program storage device of claim 11, the method further comprising validating the one of the one or more transformation patterns by checking whether some selected transformation patterns are consistent with a domain knowledge of a user.

19. The non-transitory program storage device of claim 11, wherein the direction of an arrow indicates that the value of a destination node pointed to by the arrow is associated with a label of the arrow and a value of the source node, with a relationship being denoted by the edge label, wherein leaf nodes are labeled with values, and edges are labeled with the relationship that connects a source node to the destination node.

20. The non-transitory program storage device of claim 11, wherein transforming the new plurality of RDF triples into an RDF graph comprises following links in the new plurality of RDF triples to obtain node values and edge labels from the plurality of denormalized records
- wherein each root nodes is labeled with the identifier of one of the denormalized records of the plurality of denormalized records, values of leaf nodes associated with each root node correspond to data fields associated with the identifier associated with the root node, and each edge is labeled with a predicate value of the RDF triple whose subject corresponds to a source node of said edge.

* * * * *